(12) United States Patent
Jun

(10) Patent No.: US 6,211,922 B1
(45) Date of Patent: *Apr. 3, 2001

(54) COLOR VIDEO APPARATUS FOR DISPLAYING HUE CONTROL STATES ON SCREEN

(75) Inventor: Sung-ho Jun, Suwon (KR)

(73) Assignee: Samsung Electronics Co., Ltd., Kyungki-Do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/662,146

(22) Filed: Jun. 12, 1996

(30) Foreign Application Priority Data

Jun. 12, 1995 (KR) .................................. 95-15410

(51) Int. Cl.⁷ ....................................................... H04N 5/57
(52) U.S. Cl. .......................... 348/569; 348/563; 348/564; 348/649; 345/902
(58) Field of Search ..................................... 348/563, 569, 348/570, 649, 651, 181, 182, 589, 564, 552, 553; 345/150, 153, 154, 199, 902; H04N 5/445, 5/50, 5/57

(56) References Cited

U.S. PATENT DOCUMENTS

| 4,338,624 | * | 7/1982 | D'Hautercourt et al. | 348/569 |
|---|---|---|---|---|
| 5,204,665 | * | 4/1993 | Bollman et al. | 345/155 |
| 5,237,417 | * | 8/1993 | Hayashi et al. | 348/569 |
| 5,287,172 | * | 2/1994 | Lee | 345/150 |
| 5,334,992 | * | 8/1994 | Rochat et al. | 345/150 |

(List continued on next page.)

FOREIGN PATENT DOCUMENTS

| 27 16 129 A1 | 10/1977 | (DE) . |
|---|---|---|
| 29 20 023 A1 | 11/1979 | (DE) . |
| 38 50 737 T2 | 10/1994 | (DE) . |
| 0 551 178 A2 | 7/1993 | (EP) . |
| 54-124633 | 9/1979 | (JP) . |
| 58-166882 | 10/1983 | (JP) . |
| 63-0174494 | 7/1988 | (JP) . |
| 2-13380 | 1/1990 | (JP) . |
| 2-57677 | 4/1990 | (JP) . |
| 4-6098 | 1/1992 | (JP) . |
| 4-134490 | 5/1992 | (JP) . |
| 5-74079 | 10/1993 | (JP) . |

OTHER PUBLICATIONS

Patent Abstract of Japan, Abstract No. 2–309879 (A), published Dec. 25, 1990, "Screen Display Device".
Patent Abstract of Japan, Publication No. 07072821 (A), Mar. 17, 1995, "Method and Device for Medium Display".
Patent Abstract of Japan, Abstract No. 5–183946 (A), Jul. 23, 1993, "On–Screen Display Device".

Primary Examiner—Michael Lee
Assistant Examiner—Linus H. Lo
(74) Attorney, Agent, or Firm—Sughrue, Mion, Zinn, Macpeak & Seas, PLLC

(57) ABSTRACT

A color video apparatus for displaying on-screen a hue control state of a color video signal. The apparatus includes a key input portion for inputting a hue control command of the color video signal displayed on the screen, and an on-screen-display (OSD) signal generator for generating an OSD signal for visually representing a reference color and for displaying an occupancy which indicates the degree to which the reference color contributes to the expression of a hue control state with respect to a plurality of reference colors used for expression of the hue control state, in response to the hue control command of the key input portion.

8 Claims, 2 Drawing Sheets

U.S. PATENT DOCUMENTS

| | | | | |
|---|---|---|---|---|
| 5,442,375 | * | 8/1995 | Wojacznski et al. | 345/150 |
| 5,483,259 | * | 1/1996 | Sachs | 345/153 |
| 5,521,615 | * | 5/1996 | Boyan | 348/649 |
| 5,574,509 | * | 11/1996 | Citta et al. | 348/569 |
| 5,648,781 | * | 7/1997 | Choi | 348/569 |
| 5,767,919 | * | 6/1998 | Lee et al. | 348/569 |
| 5,774,187 | * | 6/1998 | Tsunoda | 348/553 |
| 5,982,445 | * | 11/1999 | Eyer et al. | 348/461 |

* cited by examiner

COLOR VIDEO APPARATUS FOR DISPLAYING HUE CONTROL STATES ON SCREEN

BACKGROUND OF THE INVENTION

The present invention relates to a color video apparatus for displaying on-screen a hue control state.

When a user changes a setting of a television set or a video cassette recorder (VCR), the television or VCR displays an on-screen-display (OSD) signal which shows the new setting. For controlling the tint or hue, the color video apparatus displays on-screen the setting of the tint or hue, and the user adjusts the setting by referring to the displayed setting and providing appropriate key input. An existing color video apparatus on-screen-displays a present hue control state through an indicator which indicates the degree of color unbalance toward a particular color. With this system, it is difficult to recognize the color control setting. Additionally, it is very difficult to recognize the color control state displayed on a screen when the color video apparatus is controlled by a remote controller far away from the screen. It is also very difficult to recognize the color control state when the color of the on-screen display signal is close to the color of the image displayed on the screen.

SUMMARY OF THE INVENTION

To solve the above problems, it is an object of the present invention to provide a color video apparatus for displaying on-screen a color by which the hue is controlled and displaying on-screen the degree of contribution to hue expression of the color.

To accomplish the above object of the present invention, there is provided a color video apparatus for on-screen-displaying a hue control state of a color video signal on a screen, the color video apparatus comprising:

key input means for inputting a hue control command of the color video signal displayed on the screen; and on-screen-display (OSD) signal generation means for generating an OSD signal for representing a reference color visually, together with an occupancy for indicating a degree of contribution to expression of a hue control state of the reference color among a plurality of reference colors used for expression of the hue control state, in response to the hue control command of the key input means.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in detail with reference to FIGS. 1 and 2.

Figure 1:
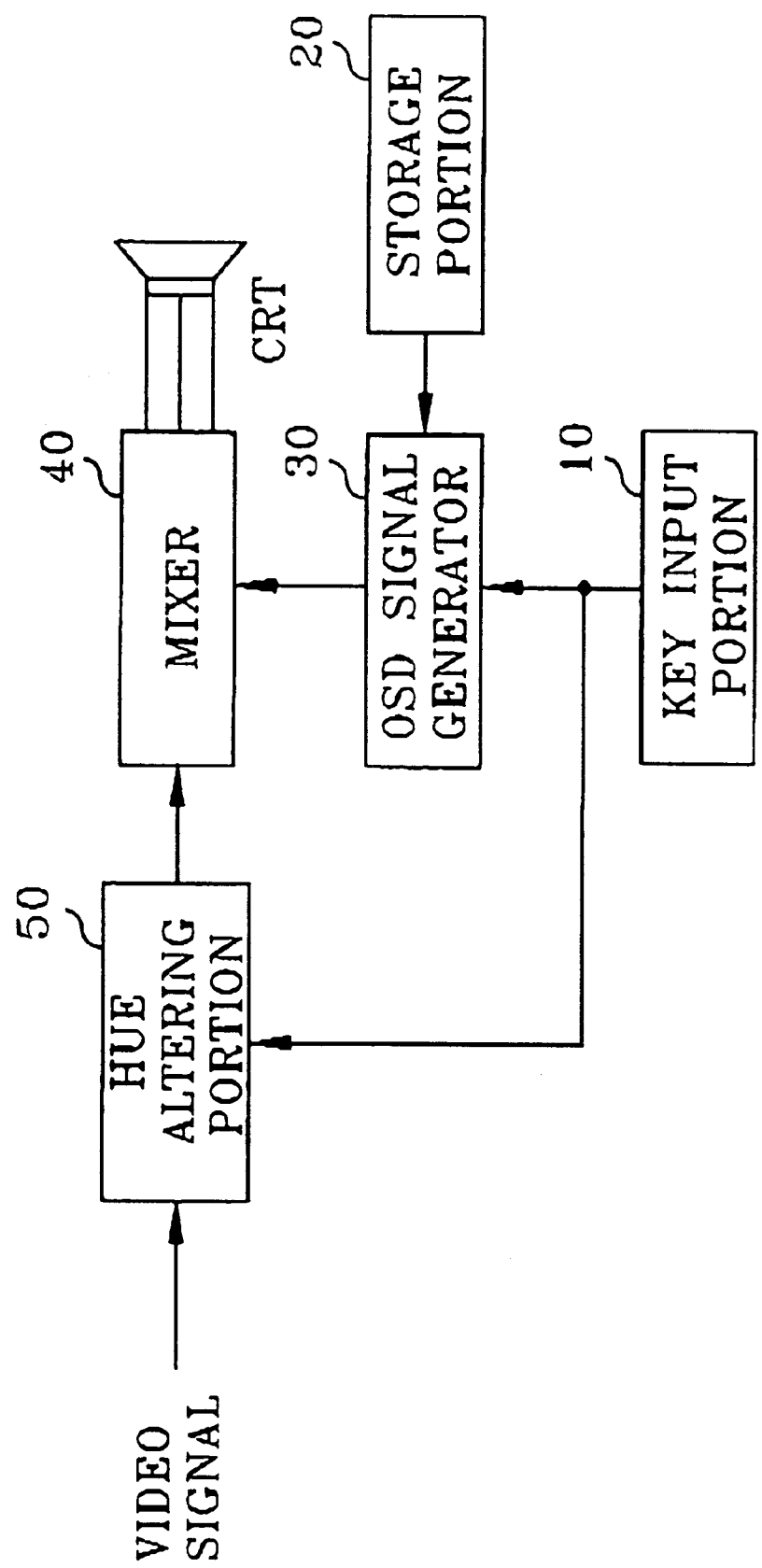
FIG. 1 is a block diagram of part of a color video apparatus according to a preferred embodiment of the present invention.

In FIG. 1, a color video apparatus according to a preferred embodiment of the present invention includes a key input portion 10 for inputting a command for hue control of a user and a storage portion 20 for storing a plurality of color data signals for differently representing hues of OSD signals. An OSD signal generator 30 generates an OSD signal using the data stored in the storage portion 20 according to a hue control command of the key input portion 10. A hue alteration portion 50 alters a hue of an external color video signal according to a hue control command. The hue altered color video signal is supplied to a mixer 40. The mixer 40 mixes a color video signal of the hue alteration portion 50 and the OSD signal of the OSD signal generator 30. The mixed signal is displayed via a cathode ray tube (CRT).

As is well known, hue or tint is an attribute which is associated with a dominant wavelength in a mixture of light waves. Therefore, the hue represents a dominant color which is perceived by an observer. That is, referring to an object as red, orange or yellow, is a reference to its hue.

Figure 2:
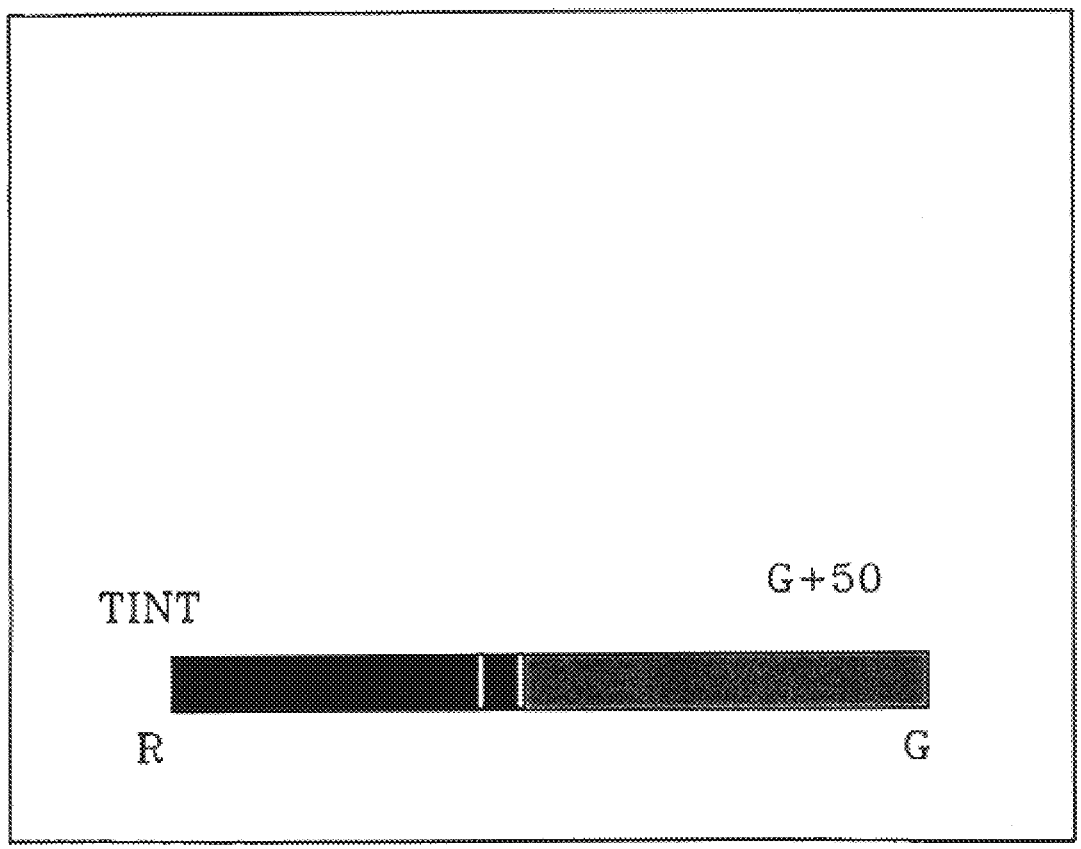
FIG. 2 is a schematic diagram of an OSD signal displayed on a screen by the FIG. 1 apparatus.

When a user selects a mode for hue control via the key input portion 10, an OSD signal representing a present hue control state is displayed on a CRT screen as shown in FIG. 2. In FIG. 2, a rod-shaped portion expresses a hue control state in an analog form, in which alphabetical characters R and G representing red and green, which are reference colors which are used for expression of the hue control state, are shown at respective ends of the rod-shaped portion. An occupancy representing a degree of contribution to hue expression of a reference color is indicated on the upper right end of the rod-shaped portion as a numerical expression exemplified by the numeral "50" of FIG. 2. The reference color which is used for a present hue control is represented by an alphabetical expression before the above-described numerical expression, the alphabetical expression being exemplified by the letter "G" of FIG. 2.

When a user inputs a command for hue control via the key input portion 10, based on an OSD signal displayed on a screen, the hue alteration portion 50 alters the hue of an external video signal and the OSD signal generator 30 reads out the data corresponding to the hue control command from the storage portion 20. The storage portion 20 stores digital value data representing color data individually corresponding to red and green and an occupancy. The digital value is an integer from 1 to 50 and is used for representing the occupancy in a digital form. The OSD signal generator 30 generates OSD signals for alphabetical expression R or G for indicating a reference color which is used for hue control, and occupancy expressions in both analog and digital forms of the reference color which is used for hue control. A reference color which is used for present hue control and an occupancy of the reference color are displayed on the screen as shown, for example, by "G+50" in FIG. 2.

Thus, when a hue control command for controlling an occupancy of a red video signal is applied from the key input portion 10, an alphabetical character "R" representing that a red color occupancy is an object for present hue control, is indicated at the upper right end of the rod-shaped portion together with the digital data of the occupancy determined by the hue control command. The red color is displayed on the screen from the leftmost end of the rod-shaped portion by a size for indicating an occupancy of the red color associated with hue expression in the analog form. When a hue control command for controlling an occupancy of a green video signal is applied, an alphabetical character "G" representing that a green color occupancy is an object for present hue control is indicated at the upper right end of the rod-shaped portion together with the digital data of the occupancy determined by the hue control command. The green color is displayed on the screen from the rightmost end of the rod-shaped portion by a size for indicating an occupancy of the green color associated with hue expression in the analog form.

Meanwhile, when the occupancies of the red and green are the same, magenta is displayed on the screen from the leftmost to the middle of the rod-shaped portion or from the rightmost to the middle thereof.

The above-described embodiment has been explained with reference to the display of the hue control state in connection with the green and red colors. It would be apparent, however, to a person skilled in the art, that hue control states of other colors can be employed within the technical scope of the present invention.

As described above, the present invention displays the hue control states, that is, displays a color whose occupancy is controlled for hue control, and simultaneously displays the occupancy of the color in analog and digital form. The present invention thereby solves the problems of conventional arrangements for displaying on-screen the present hue control state by allowing the user to more easily see the present hue control state. According to the present invention, even a user who is far from the screen can easily see the hue control state.

While only certain embodiments of the invention have been specifically described herein, it will apparent that numerous modifications may be made thereto without departing from the spirit and scope of the invention.

What is claimed is:

1. A color video apparatus for displaying a hue control state of a color video signal on a screen, the color video apparatus comprising:
   input means for inputting a hue control command of the color video signal displayed on the screen; and
   on-screen-display (OSD) signal generation means for generating an OSD signal which visually represents a reference color among a plurality of reference colors used for expression of the hue control state and which displays an occupancy for indicating a degree of contribution to expression of a hue control state of said reference color compared with occupancies of said plurality of reference colors, in response to said hue control command of said input means;
   wherein said reference color and another one of said plurality of reference colors are simultaneously displayed in a single composite image;
   wherein said reference color occupies one portion of said single composite image and said another one of said plurality of reference colors occupies another portion of said single composite image;
   wherein an amount of said single composite image occupied by said reference color corresponds to an occupancy of said reference color and an amount of said single composite image occupied by said another one of said plurality of reference colors corresponds to an occupancy of said another one of said plurality of reference colors; and
   wherein only when an occupancy of said reference color is the same as an occupancy of said another one of said plurality of reference colors said OSD signal generation means generates an OSD signal for displaying a color which is different from said reference color and said another one of said plurality of reference colors in one of said one portion and said another portion of said single composite image so as to allow a user to more easily recognize an equivalence of an occupancy between said reference color and said another one of said plurality of reference colors.

2. A color video apparatus according to claim 1, wherein said OSD signal generation means further generates OSD signals for displaying a character representative of said reference color and a numeral representative of a degree of occupancy of said reference color.

3. A color video apparatus according to claim 2, wherein said OSD signal generation means further comprises storage means for storing a plurality of digital value data for expressing a plurality of color data and the occupancy, in correspondence to the plurality of the reference colors individually, and for reading corresponding digital value data and a plurality of color data from the storage means and generating an OSD signal using the read data.

4. A color video apparatus for displaying a hue control state of a color video signal on a screen, the color video apparatus comprising:
   input means for inputting a hue control command of the color video signal displayed on the screen; and
   on-screen-display (OSD) signal generation means for generating an OSD signal in response to said hue control command of said input means;
   wherein said OSD signal visually represents a composite image of a first reference color and a second reference color;
   wherein said first reference color occupies a first portion of said composite image and said second reference color occupies substantially all of a remaining portion of said composite image;
   wherein an occupancy of at least one of said first reference color and said second reference color corresponds to a size of a respective said first portion and said substantially all of a remaining portion corresponding to a degree of said occupancy;
   wherein said occupancy of said at least one of said first reference color and said second reference color is represented by at least one of a numeral and a character corresponding to a degree of said occupancy; and
   wherein only when said occupancy of a selected one of said first reference color and said second reference color is the same as an occupancy of the other one of said first reference color and said second reference color, a third color having a hue that is different from said first reference color and said second reference color is displayed to indicate such equivalence of occupancy.

5. A color video apparatus according to claim 4, wherein said composite image is a rod shaped bar, and wherein said first reference color occupies a first portion of said rod shaped bar and said second reference color occupies substantially all of a remaining portion of said rod shaped bar.

6. A color video apparatus according to claim 5, wherein an occupancy of said selected one of said first reference color and said second reference color is represented by one of an increasing size or a decreasing size of a respective said first portion and said substantially all of a remaining portion corresponding to an increasing or a decreasing of a degree of said occupancy by said input means.

7. A color video apparatus according to claim 6, wherein said third color replaces one of said first reference color and said second reference color.

8. A color video apparatus according to claim 1, wherein said single composite image is a single rod shaped bar, and wherein said reference color occupies one portion of the single rod shaped bar and said another one of said plurality of reference colors occupies another portion of the single rod shaped bar.

* * * * *